(12) United States Patent
Knapke

(10) Patent No.: US 6,561,939 B1
(45) Date of Patent: May 13, 2003

(54) GEAR MODULE FOR CLUTCH ACTUATOR IN DIFFERENTIAL ASSEMBLY

(75) Inventor: Brian Vitales Knapke, Fort Wayne, IN (US)

(73) Assignee: Torque-Traction Technologies, Inc., Holland, OH (US)

( * ) Notice: Subject to any disclaimer, the term of this patent is extended or adjusted under 35 U.S.C. 154(b) by 0 days.

(21) Appl. No.: 09/985,800

(22) Filed: Nov. 6, 2001

(51) Int. Cl.[7] .............................................. F16H 48/30
(52) U.S. Cl. ...................... 475/150; 192/84.6; 192/84.7; 475/231; 475/239
(58) Field of Search .............................. 192/54.52, 84.6, 192/84.7, 70.23; 475/150, 231, 239

(56) References Cited

U.S. PATENT DOCUMENTS

| | | | |
|---|---|---|---|
| 2,747,710 A | * 5/1956 | Smith | 192/84.6 |
| 4,805,486 A | 2/1989 | Hagiwara et al. | |
| 4,895,236 A | 1/1990 | Sakakibara et al. | |
| 4,950,214 A | 8/1990 | Botterill | |
| 4,976,347 A | 12/1990 | Sakakibara et al. | |
| 5,022,503 A | * 6/1991 | Wakabayashi | 477/84 R |
| 5,106,349 A | 4/1992 | Botterill et al. | |
| 5,279,401 A | 1/1994 | Stall | |
| 5,934,433 A | 8/1999 | Leimbach et al. | |
| 5,947,857 A | * 9/1999 | Organek et al. | 475/150 |
| 6,398,686 B1 | * 6/2002 | Irwin | 475/150 |

* cited by examiner

Primary Examiner—Richard M. Lorence
Assistant Examiner—Eric M Williams
(74) Attorney, Agent, or Firm—Liniak, Berenato & White

(57) ABSTRACT

A limited slip differential assembly comprises a friction clutch assembly and a clutch actuator assembly including an actuator motor, a clutch actuator, and a gear module for drivingly coupling the actuator motor to the clutch actuator. The gear module includes a casing having a first mounting flange for fixing the casing to a differential housing and a second mounting flange for fixing the casing to the actuator motor, two gear support arms outwardly extending from the first mounting flange into the differential housing through an opening therein, a gear shaft supported by the gear support arms, and a pair of coaxial reduction gear members drivingly coupled to the gear shaft. One of the reduction gear members is drivingly coupled to the actuator motor and the other of the reduction gear members is drivingly coupled with the clutch actuator.

16 Claims, 4 Drawing Sheets

GEAR MODULE FOR CLUTCH ACTUATOR IN DIFFERENTIAL ASSEMBLY

BACKGROUND OF THE INVENTION

1. Field of the Invention

The present invention relates to a clutch actuator for a differential assembly, and more particularly to a gear module for the clutch actuator in the differential assembly providing limited slip and locking capabilities.

2. Description of the Prior Art

Conventionally, differentials well known in the prior art, are arranged in a power transmission system of a motor vehicle to allow a pair of output shafts operatively coupled to an input shaft to rotate at different speeds, thereby allowing the wheel associated with each output shaft to maintain traction with the road while the vehicle is turning. Such a device essentially distributes the torque provided by the input shaft between the output shafts. However, these types of differentials known in the art as an open differentials, i.e. a differential without clutches or springs, are unsuitable in slippery conditions where one wheel experiences a much lower coefficient of friction than the other wheel; for instance, when one wheel of a vehicle is located on a patch of ice or mud and the other wheel is on dry pavement. In such a condition, the wheel experiencing the lower coefficient of friction loses traction and a small amount of torque to that wheel will cause a "spin out" of that wheel. Since the maximum amount of torque, which can be developed on the wheel with traction, is equal to torque on the wheel without traction, i.e. the slipping wheel, the engine is unable to develop any torque and the wheel with traction is unable to rotate. Thus, the necessity for a differential, which limits the differential rotation between the output shafts to provide traction on slippery surfaces, is well known.

A number of devices have been developed to limit wheel slippage under such conditions. Conventionally, they use a frictional clutch between the side gears and the differential casing. The frictional clutch may be selectively actuated by various hydraulic or electrical actuator assemblies, which may be external to the differential case or may be constructed of elements disposed inside the differential casing. Typically, those actuator assemblies are rather complex, expensive, laborious in assembly, and require extensive machining of a differential housing.

SUMMARY OF THE INVENTION

The present invention provides an improved electronically controlled differential assembly providing limited slip capabilities.

The differential assembly in accordance with the preferred embodiment of the present invention includes a rotatable differential case housing a differential gearing rotatably supported in the case and a pair of opposite side gears in meshing engagement with the differential gearing to permit differential rotation thereof. The differential assembly includes a friction disk clutch assembly disposed within the differential case and provided to lock the differential assembly. The friction clutch assembly includes a number of alternating outer friction plates non-rotatably coupled to the differential case and inner friction plates splined to a thrust collar disposed within the differential case coaxially to the side gears and adapted for loading the friction clutch plates when actuated. An electronic selectively controllable clutch actuator assembly is provided for axially displacing the thrust collar in order to load the friction assembly when needed, thus providing the differential assembly with a limited slip function. The clutch actuator assembly including an actuator motor, a clutch actuator, and a gear module for drivingly coupling the actuator motor to the clutch actuator. The gear module includes a casing having a first mounting flange for fixing the casing to a differential housing and a second mounting flange for fixing the casing to the actuator motor, two gear support arms outwardly extending from the first mounting flange into the differential housing through an opening therein, a gear shaft supported by the gear support arms, and a pair of coaxial reduction gear members drivingly coupled to the gear shaft. One of the reduction gear members is drivingly coupled to the actuator motor and the other of the reduction gear members is drivingly coupled with the clutch actuator.

Therefore, the differential assembly in accordance with the present invention is simple, compact, inexpensive in manufacturing, easy to assemble, and provides improved manufacturability and serviceability.

BRIEF DESCRIPTION OF THE DRAWINGS

Other objects and advantages of the invention will become apparent from a study of the following specification when viewed in light of the accompanying drawings, wherein.

DETAILED DESCRIPTION OF PREFERRED EMBODIMENTS

The preferred embodiment of the present invention will now be described with the reference to accompanying drawings.

Figure 1:
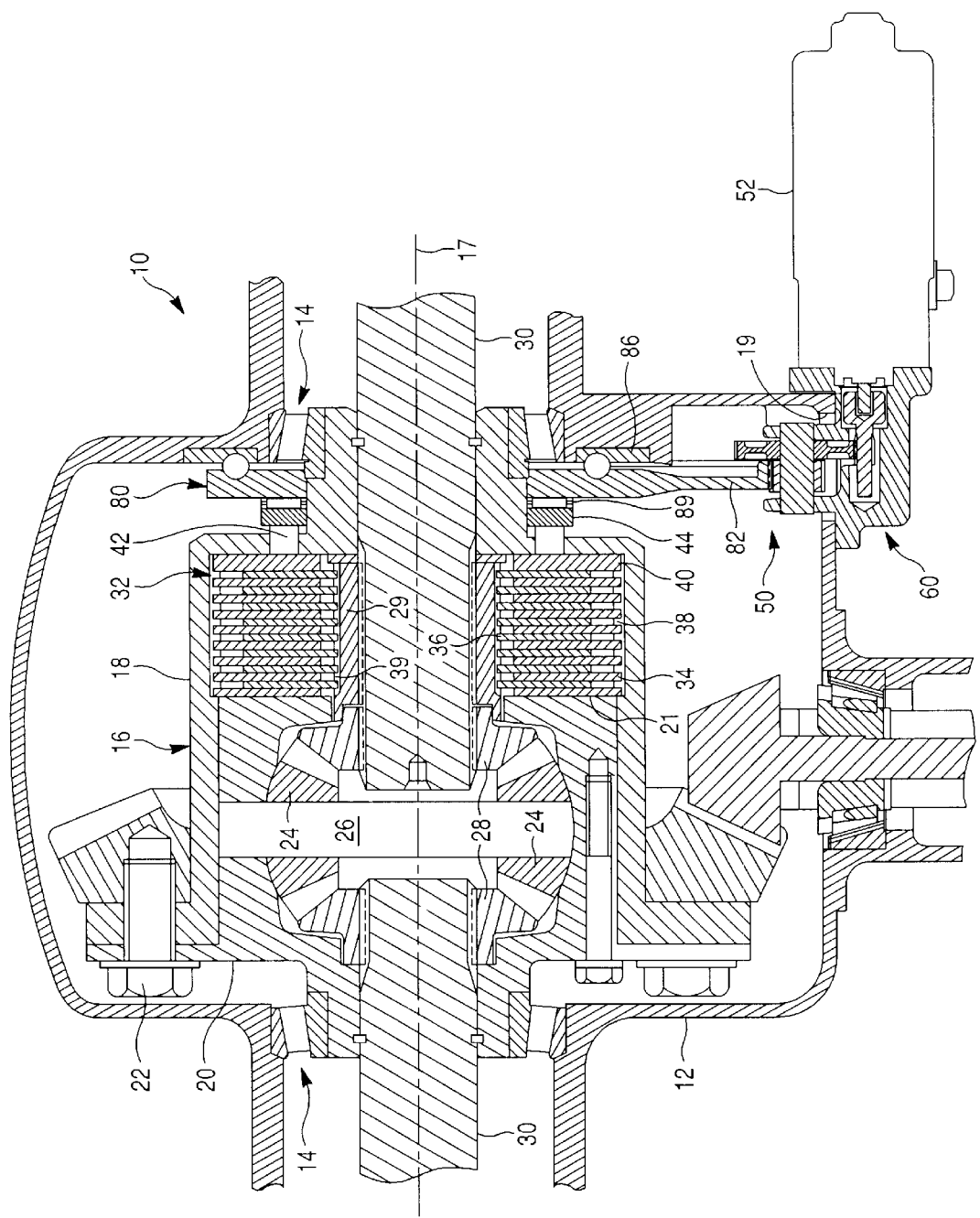
FIG. 1 is a sectional view of a limited slip differential assembly in accordance with the present invention.

Referring first to FIG. 1 of the drawing, an electronically controlled limited slip differential (LSD) assembly 10 in accordance with the present invention is illustrated. Reference numeral 16 defines a differential case rotatably supported in a differential housing 12 through roller bearings 14, and defines an axis of rotation 17. The differential case 16 is made of two halves 18 and 20 fastened to each other, preferably by means of bolts 22.

The differential assembly is provided with a set of pinion gears 24 rotatably supported on a pinion shaft 26 secured to the differential case 16. The pinion gears 24 engage a pair of opposite side gears 28 adapted to rotate about the axis 17. The side gears 28 are splined to output axle shafts 30.

A friction clutch assembly 32 is provided within the differential case 16. The friction clutch assembly 32, well known in the prior art, includes sets of alternating outer friction plates 34 and inner friction plates 36. Conventionally, an outer circumference of the outer friction plates 34 is provided with projections that non-rotatably engages corresponding grooves 38 formed in the differential case 16. Similarly, an outer circumference of the inner friction plates 36 is provided with projections that non-rotatably engage corresponding grooves 39 formed in a sleeve 29, which in turn is splined to the associated axle shaft 30. At the same time, both the outer friction plates 34 and the inner friction plates 36 are slideable in the axial direction. The friction clutch assembly 32 abuts on the one side axially on a support face 21 which is a component of the second half 20 of the differential case 16, and on the other side by an annular pressure plate 40 through which pressure can be applied to the friction clutch assembly 32. Thrust pins 42 protruding through the first half 18 of the differential case 16 are provided, against which rests an annular thrust collar 44 arranged outside of the differential case 16. The annular pressure plate 40 is disposed within the differential case 16 and is provided to axially load the friction clutch plates 34 and 36 in order to actuate the friction clutch assembly 32. Furthermore, an outer circumference of the pressure plate 40 is provided with projections that engage corresponding grooves 38 formed in the differential case 16, thus axially slidably, but non-rotatably coupling the pressure plate 40 to the differential case 16.

In order to selectively actuate the friction clutch assembly 32 when necessary, the differential assembly 10 further comprises an actuator assembly 50 which is controllable by an electronic control unit (not shown) based on data from vehicle wheel sensors (not shown), to cause the axial displacement of the pressure plate 40 in the direction of the friction clutch assembly 32. Various different actuator assemblies known in the prior art may be used in the differential assembly of the present invention. A preferred embodiment of the actuator assembly 50 is described below with the reference to FIGS. 1–4.

The actuator assembly 50 comprises an actuator motor in the form of a reversible electric motor 52 selectively controlled by the electronic control unit (not shown), a gear module 60 including a reduction gearing 62 and adapted for mounting the motor 52 to the differential housing 12, and a ball-ramp clutch actuator 80. It will be appreciated that any other appropriate type of the actuator motor, such as hydraulic or pneumatic, are within the scope of the present invention.

Figure 2:
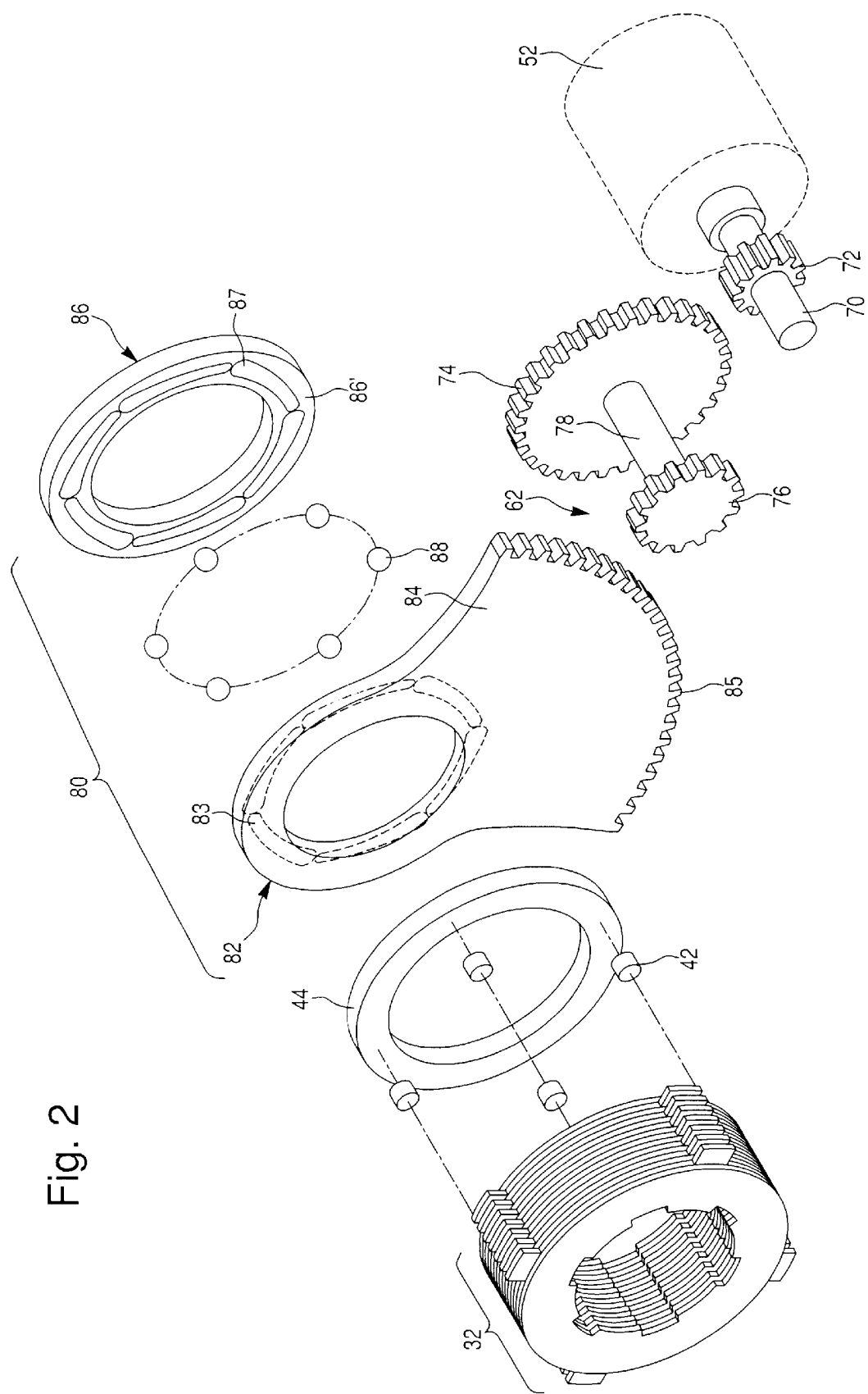
FIG. 2 is an exploded perspective view of an actuator assembly for the limited slip differential assembly in accordance with the preferred embodiment of the present invention.

The ball-ramp actuator 80 includes an actuating ring 82 driven by the electric motor 52 through the reduction gearing 62 of the gear module 60, as illustrated in detail in FIG. 2.

Figure 3:
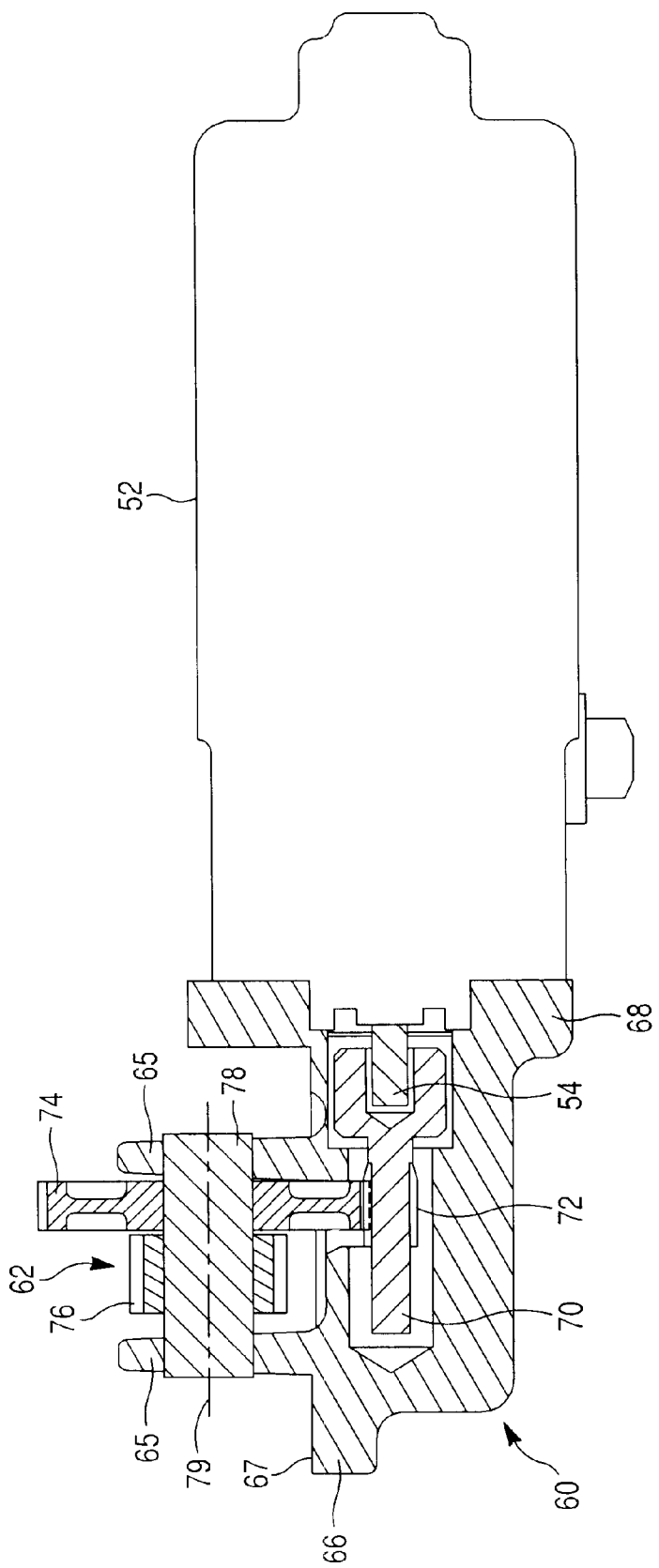
FIG. 3 is a sectional view of a gear module in accordance with the present invention.
Figure 4:
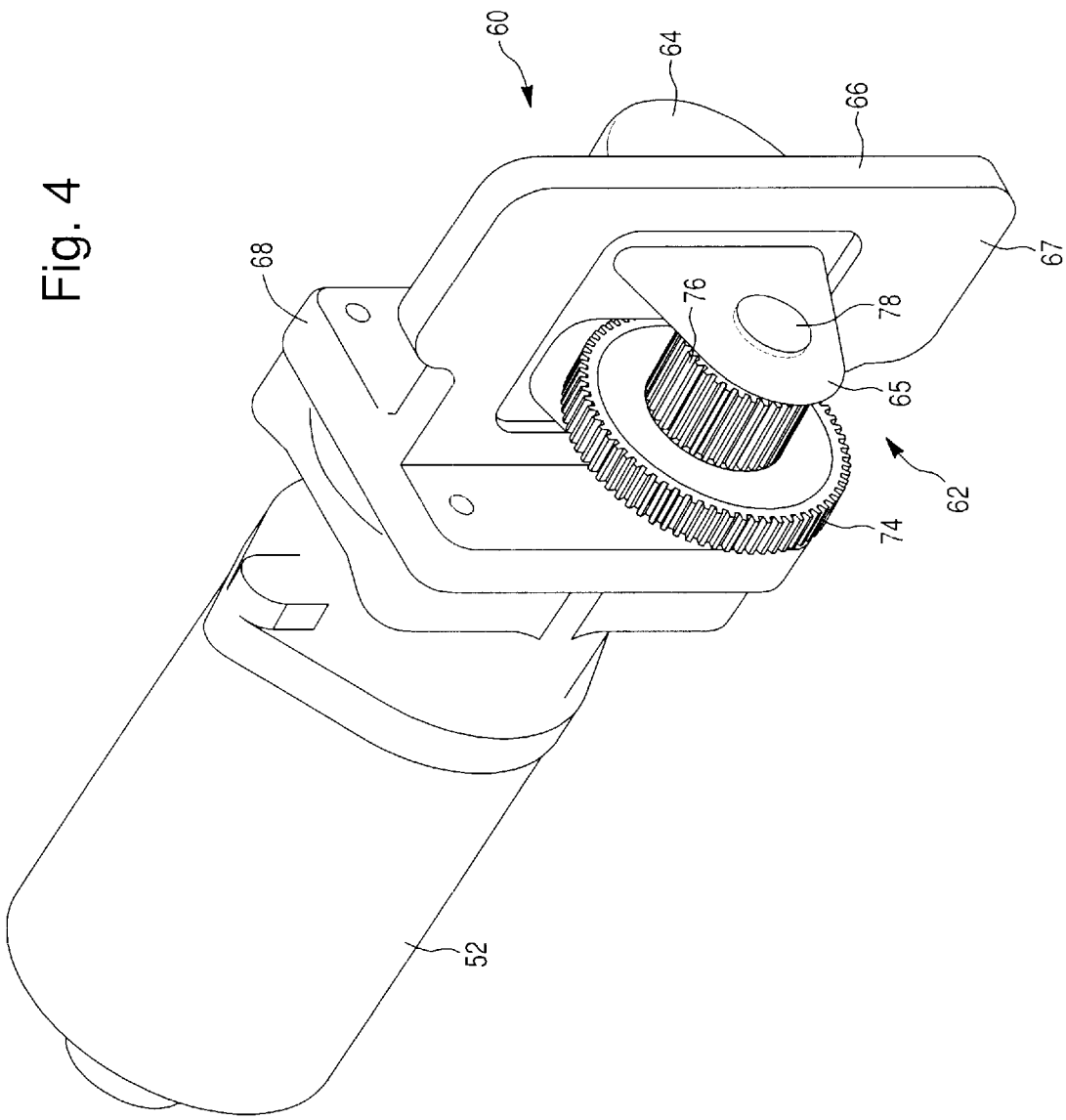
FIG. 4 is a perspective view of the gear module in accordance with the present invention.

The gear module 60, illustrated in detail in FIGS. 3 and 4, includes a gear casing 64 having a first flange 66 adapted for securing the casing 64 to the differential housing 12, and a second flange 68 adapted for securing the electric servomotor 52 to the casing 64. Preferably, the gear casing 64 of the gear module 60 is secured to the differential housing 12 and the electric servomotor 52 by means of threaded fasteners, such as bolts. However, any other appropriate means for securing the gear casing 64 to the differential housing 12 and the electric servomotor 52, well known to those skilled in the art, such as welding, are within the scope of the present invention.

The gearing 62 includes a drive shaft 70 formed integrally with a drive gear 72, and a pair of coaxial reduction gears 74 and 76. The drive shaft 70 is rotatably supported with the gear casing 64. An outboard end of the shaft 70 is drivingly coupled to an output shaft 54 of the electric motor 52. Furthermore, the gear casing 64 includes preferably two gearing support arms 65 extending from a mating face 67 of the first flange 66 toward the differential case 16 within the differential housing 12 through the opening 19 therein. The support arms 65 are substantially perpendicular to the mating face 67 of the first flange 66 and to the axis of rotation 17 of the differential case 16. Alternatively, the gear casing 64 may have one, three or any other number of support arms 65. Extending between the support arms 65 is a gear shaft 78 for rotatably supporting the reduction gears 74 and 76. The gear shaft 78 has a longitudinal axis 79 substantially parallel to the axis of rotation 17 of the differential case 16. The large gear 74 is in mesh with the drive gear 72, and the small gear 76 is in mesh with the actuating ring 82 of the ball-and-ramp actuator 80.

Preferably, the ball-and-ramp actuator 80, well known to those skilled in the art, is employed.

The preferred embodiment the ball-ramp clutch actuator 80 of the actuator assembly 50 of the present invention, illustrated in detail in FIG. 2, includes an abutment ring 86 fixed to the differential housing 12, the actuating ring 82, and a plurality of balls 88 engaging opposed circumferentially extending recesses of variable axial depth therein. The actuating ring 82 has a radially extended arcuate portion 84 formed with external gear teeth 85 meshing with teeth of the reduction gear 76 so that the rotation of the servomotor 52 causes the angular displacement of the actuating ring 80, preferably less than 180°. As further illustrated in the FIG. 2, an annular radial surface 86' of the abutment ring 86 facing the actuating ring 82, is formed with a set of circumferentially extending grooves 87 of varying axial depth, facing complementary grooves 83 in the actuating ring 82, whose depth varies in the opposite circumferential sense. A corresponding number of balls 88 disposed between the abutment ring 86 and the actuating ring 82, one in each pair of the facing grooves 83 and 87. It will be appreciated that when the servomotor 52 moves the actuating ring 82 angularly relative to the abutment ring 86, the actuating ring 82 moves axially and causes the pressure plate 40 to frictionally load the clutch assembly 32. The axial movement of the actuating ring 82 is transmitted to the pressure plate 40 engaging the friction plates 34, 36, through a thrust bearing 89, the annular thrust ring 44, and the thrust pins 42 extending through the differential case 16.

Alternatively, a cam disc actuator including cooperative cam surfaces (not shown) provided on opposite sides of the abutment ring 86 and the actuating ring 82, may be used as the clutch actuator.

It will be appreciated that any other types of the clutch actuators known in the prior art may be employed.

During the assembling of the lockable differential 10, the gear module 60 is mounted to the differential housing 12 by inserting the reduction gears 74, 76 supported by the arms 65, into the opening 18 in the differential housing 12, meshing the reduction gear 76 with the actuating ring 82, and aligning the reduction gear 76 with the actuating ring 72 by selectively axially displacing the gear casing 64 along the opening 19 in the differential housing 12 until the required alignment between the gears is achieved.

Therefore, the electronically controlled differential assembly in accordance with the present invention represents a novel arrangement of the limited slip differential assembly that is a simple, compact, inexpensive in manufacturing, easy to assemble, and provides improved manufacturability and serviceability. Manufacturability is improved due to reduced scrap from segregated machining processes and improved machining tolerances. The serviceability is improved due to better access to the reduction gear pack. Furthermore, with the differential assembly of the present invention, it is easier to maintain positional tolerances of the actuator motor and the reduction gearing to the differential housing and the clutch actuator due to the simpler machining process.

The foregoing description of the preferred embodiments of the present invention has been presented for the purpose of illustration in accordance with the provisions of the Patent Statutes. It is not intended to be exhaustive or to limit the invention to the precise forms disclosed. Obvious modifications or variations are possible in light of the above teachings. The embodiments disclosed hereinabove were chosen in order to best illustrate the principles of the present invention and its practical application to thereby enable those of ordinary skill in the art to best utilize the invention in various embodiments and with various modifications as are suited to the particular use contemplated, as long as the principles described herein are followed. Thus, changes can be made in the above-described invention without departing from the intent and scope thereof. It is also intended that the scope of the present invention be defined by the claims appended thereto.

What is claimed is:

1. A gear module for drivingly coupling a clutch actuator to an actuator motor in a differential assembly having a friction clutch assembly, said gear module comprising:
    a casing having a first mounting flange for securing said casing to a differential housing and a second mounting flange for securing said casing to said actuator motor;
    a reduction gearing including at least two coaxial reduction gear members, said reduction gear members are drivingly coupled to a common gear shaft;
    at least one gear support arm for rotatably supporting said gear shaft, said gear support arm outwardly extending from said first mounting flange into said differential housing through an opening therein;
    wherein one of said reduction gear members of said reduction gearing is drivingly coupled to said actuator motor and the other of said reduction gear members of said reduction gearing is in mesh with an actuating ring of said clutch actuator.

2. The gear module as defined in claim 1, wherein said gear shaft has an axis of rotation substantially parallel to an axis of rotation of said differential assembly.

3. The gear module as defined in claim 1, wherein said gear support arm is substantially perpendicular to an axis of rotation of said differential assembly.

4. The gear module as defined in claim 1, wherein said reduction gearing further includes a drive shaft drivingly coupled to an output shaft of said actuator motor at one end thereof and provided with a drive gear member meshing with one of said reduction gear members.

5. The gear module as defined in claim 1, wherein said wherein said clutch actuator is a ball-ramp actuator.

6. The gear module as defined in claim 1, wherein said wherein said actuator motor is a reversible electric motor.

7. The gear module as defined in claim 1, wherein said friction clutch assembly includes a number of alternating inner and outer friction plates.

8. A gear module for drivingly coupling a ball-ramp clutch actuator to a reversible electric motor in a differential assembly having a multi-plate friction clutch assembly, said gear module comprising:
    a casing having a first mounting flange for securing said casing to a differential housing and a second mounting flange or securing said casing to said electric motor;
    a reduction gearing including two coaxial reduction gear members and a drive gear member meshing with one of said coaxial reduction gear members and integral to a drive shaft drivingly coupled to an output shaft of said electric motor;
    said coaxial reduction gear members are drivingly coupled to a common gear shaft, said gear shaft has an axis of rotation substantially parallel to an axis of rotation of said differential assembly;
    a pair of axially spaced gear support arms for rotatably supporting said gear shaft, said gear support arms outwardly extending from said first mounting flange into said differential housing through an opening therein substantially perpendicularly to said axis of rotation of said differential assembly;
    wherein one of said reduction gear members of said reduction gearing is drivingly coupled to said actuator motor and the other of said reduction gear members of said reduction gearing is in mesh with an actuating ring of said clutch actuator.

9. A differential assembly comprising:
    a differential housing;
    a differential case rotatably supported in said housing and defining an axis of rotation;
    two side gears arranged coaxially and-rotatable relative to said differential case;
    a thrust collar arranged coaxially to one of said side gears, said thrust collar is axially slidable so as to allow axial movement thereof along said axis;
    a friction clutch assembly, said friction clutch assembly adapted to be axially loadable by said thrust collar to cause a frictional restriction of a differential rotation of said side gears; and
    a selectively controllable actuator assembly including an actuator motor, a clutch actuator for axially displacing said thrust collar in order to load said friction clutch assembly, and a gear module for drivingly coupling said actuator motor to said clutch actuator;
    said gear module including:
        a casing having a first mounting flange for fixing said casing to said differential housing and a second mounting flange for fixing said casing to said actuator motor;
        a reduction gearing including at least two coaxial reduction gear members, said reduction gear members are drivingly coupled to a common gear shaft;
        at least one gear support arm for rotatably supporting said reduction gearing, said gear support arm outwardly extending from said first mounting flange into said differential housing through an opening therein;
        wherein one of said reduction gear members of said reduction gearing is drivingly coupled to said actuator motor and the other of said reduction gear members of said reduction gearing is drivingly coupled with said clutch actuator.

10. The differential assembly as defined in claim 9, wherein said clutch actuator comprising:
    an abutment ring fixed to said differential housing; and
    an actuating ring angularly and axially movable relative to said abutment ring and driven by said electric motor.

11. The differential assembly as defined in claim 10, wherein the other of said reduction gear members of said reduction gearing is in mesh with said actuating ring of said clutch actuator.

12. The differential assembly as defined in claim 10, wherein said actuating ring is rotatable along a circumferential path of less than 180°.

13. The differential assembly as defined in claim 9, wherein said actuator motor is a reversible electric motor.

14. The differential assembly as defined in claim 10, wherein said clutch actuator is a ball-and-ramp actuator including cooperative surfaces provided on opposite sides of said actuating ring and said abutment ring, and ball rolling members disposed therebetween so that said actuating ring axially displaces said thrust collar in response to the angular movement thereof.

15. The differential assembly as defined in claim 9, wherein said friction clutch assembly includes a number of alternating inner friction plates non-rotatably coupled to one of said side gears, and outer friction plates non-rotatably coupled to said differential case; said friction clutch assembly adapted to be axially loadable by said thrust collar to cause said frictional restriction of said differential rotation of said side gears.

16. A differential assembly comprising:
   a differential housing;
   a differential case rotatably supported in said housing and defining an axis of rotation;
   two side gears arranged coaxially to said axis of rotation;
   a thrust collar arranged coaxially to one of said side gears, said thrust collar is axially slidable so as to allow axial movement thereof along said axis;
   a friction clutch assembly including a number of alternating inner friction plates non-rotatably coupled to one of said side gears, and outer friction plates non-rotatably coupled to said differential case; said friction clutch assembly adapted to be axially loadable by said thrust collar to cause a frictional restriction of a differential rotation of said side gears; and
   a selectively controllable actuator assembly including a reversible electric motor, a ball-and-ramp clutch actuator for axially displacing said thrust collar in order to load said friction assembly, and gear module for drivingly coupling said actuator motor to said clutch actuator;
   said ball-and-ramp clutch actuator including:
      an abutment ring fixed to said differential housing;
      an actuating ring angularly and axially movable relative to said abutment ring, said actuating ring is rotatable by said electric motor along a circumferential path of less than 180°; and
      a plurality of ball members disposed between cooperative surfaces provided on opposite sides of said actuating ring and said abutment ring so that said actuating ring axially displaces said thrust collar in response to the angular movement thereof;
   said gear module including:
      a casing having a first mounting flange for fixing said casing to said differential housing and a second mounting flange for fixing said casing to said actuator motor;
      a reduction gearing including two coaxial reduction gear members, said reduction gear members are drivingly coupled to a common gear shaft;
      a pair of axially spaced gear support arms for rotatably supporting said reduction gearing, said gear support arms extend outwardly from said first mounting flange into said differential housing through an opening therein;
      wherein one of said reduction gear members of said reduction gearing is drivingly coupled to said actuator motor and the other of said reduction gear members of said reduction gearing is drivingly coupled with said actuating ring of said clutch actuator.

\* \* \* \* \*